United States Patent [19]

Vogel et al.

[11] 4,185,284
[45] Jan. 22, 1980

[54] GROUND STATION FOR THE DME DISTANCE MEASURING SYSTEM

[75] Inventors: Horst Vogel, Korntal; Herbert Kleiber, Ludwigsburg, both of Fed. Rep. of Germany

[73] Assignee: International Standard Electric Corporation, New York, N.Y.

[21] Appl. No.: 962,961

[22] Filed: Nov. 22, 1978

[30] Foreign Application Priority Data

Nov. 30, 1977 [DE] Fed. Rep. of Germany ....... 2753421

[51] Int. Cl.² .............................................. G01S 9/56
[52] U.S. Cl. .............................................. 343/6.8 R
[58] Field of Search ................................... 343/6.8 R

[56] References Cited

U.S. PATENT DOCUMENTS 3,715,749   2/1973   Archer .......................... 343/6.8 R X Primary Examiner—Tubbesing T. H.
Attorney, Agent, or Firm—O'Neil William T.

[57] ABSTRACT

A novel DME transponder having a plurality of directional antennas arranged equidistantly on a circle each having a radial, highly directional pattern and as a group covering 360° in the azimuth plane. The antennas are divided into at least two groups of nonadjacent antennas. Each group is connected to a receiver. The DME reply signal is radiated from the group containing the antenna which has received the DME interrogation signal with the greatest amplitude. The signal radiated in the direction of the interrogator is the DME reply signal, and the signals radiated in the other directions are used as filler pulses.

8 Claims, 2 Drawing Figures

GROUND STATION FOR THE DME DISTANCE MEASURING SYSTEM

BACKGROUND OF THE INVENTION

The present invention relates to a ground station comprising a plurality of directional antennas for a two-way ranging system which, after a fixed time following reception of a DME interrogation signal, radiates a DME reply signal approximately in the direction of arrival of the interrogation signal.

This ground station is suitable for the distance-measuring portion of the so-called DLS landing system, which is described in an article by M. Bohm and G. Peuker, "DLS-ein neues Anflugund Landesystem", Elektrisches Nachrichtenwesen, Vol. 50 (1975), No. 1, on pages 37–43 (particularly on p. 39).

A detailed description of a known DME system, which is also used for distance measurement in TACAN, is contained, for example, in an article by R. I. Colin and S. H. Dodington, "Principles of TACAN", Electrical Communication, Vol. 33, (1965), No. 1, on pages 11 to 25 (particularly in section 2.3).

Using prior art directional reception and directional radiation, errors caused by multipath propagation can be reduced. With directional radiation of the DME reply signal, however, it is a practical requirement that it shall be possible to receive at least 700 pulse pairs per second from all directions and this requirement is no longer fulfilled in prior art apparatus of the type. This number of pulses is necessary to derive (in the airborne equipment) a voltage for controlling receiver sensitivity.

An important specification to be met by DME equipment is contained in "International Standards and Recommended Practices, Aeronautical Telecommunications, Annex 10 to the Convention on International Civil Aviation (ICAO)", Section 3.5. The part essential applicable to the invention is contained in Section 3.5.3.1.5.4.

SUMMARY

Accordingly, the object of the invention is to provide a ground station for a two-way ranging system which reduces the errors caused by multipath propagation and meets the ICAO specification referred to above.

The ground station of the invention employs a plurality of directive antenna, preferably equally spaced about a circle in the azimuth plane and each having its radiation directed radially outward. About the circle, alternate antennas are grouped together in a first group, and the remaining antennas in between comprise a second group. At least one receiver is assigned to the antennas of each of said groups through appropriate signal combining apparatus. Amplitude comparison means determines which of the two antenna groups received an interrogating signal with greatest signal strength, and the DME reply is generated by a transmitter and directed through the same antenna group through appropriate duplexing means.

The DME ground station according to the invention provides high measurement accuracy and meets the ICAO specifications. It is substantially insensitive to multipath transmission interference.

BRIEF DESCRIPTION OF THE DRAWINGS

The invention will now be explained in more detail and by way of example with reference to the accompanying drawings, in which.

DETAILED DESCRIPTION

Figure 1:
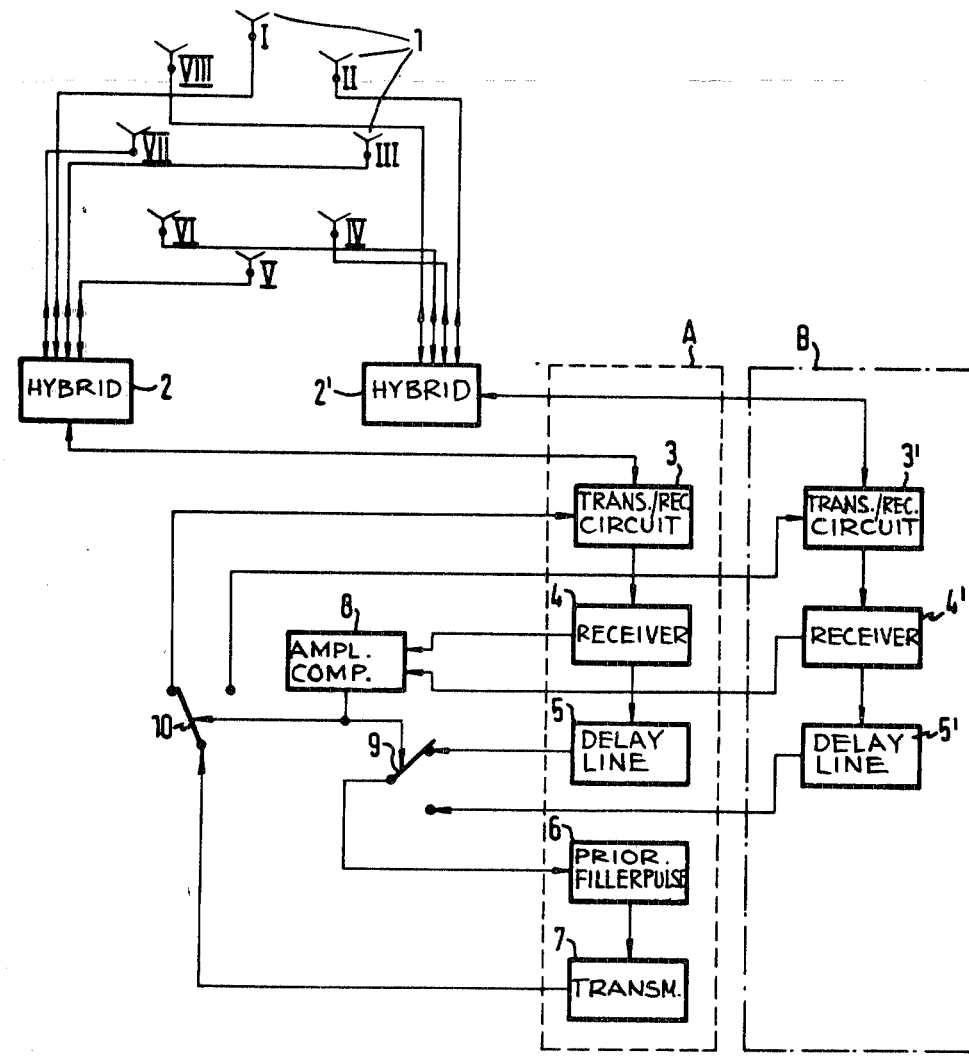
FIG. 1 is a block diagram of the DME ground station of the invention.

First of all, the operation of a DME ground station as is known, for example, from the article published in "Electrical Communication" will be described. Such a ground station contains a block A as also shown in FIG. 1, and an omnidirectional antenna. The signal received by this omnidirectional antenna is applied via a transmit/receive circuit to a receiver, in which the received signal is converted in frequency and demodulated. The resulting video signal, consisting of a pulse pair, is delayed in a delay line so that the time between reception of the interrogation signal and radiation of the reply signal is 50 $\mu$s. The delayed signal is applied to a "priority and filler-pulse device" as also shown in FIG. 1 at 6, which controls a transmitter either with a filler pulse or with the reply pulse pair. The control with filler pulses, which are generated by a noise generator, for example, takes place when no DME pulses are present. In the presence of DME pulses, the reply signal is synchronously generated in the transmitter. It is applied via a transmit/receive circuit to the omnidirectional antenna and radiated from there.

Further prior art details are not necessary for an understanding of the invention and are, therefore, not shown but are available to the skilled reader in the technical literature including that cited as typical prior art herein. Control techniques, such as the pilot pulse technique, are not considered, either. Further details are also given in the text by M. Kayton and W. R. Fried, entitled "Avionics Navigation Systems", John Wiley & Sons, Inc., New York 1969, pp. 181–187; in the book by E. Kramar, entitled "Funksysteme fur Ortung und Navigation", Berliner Union GmbH, Stuttgart, 1973, pp. 147–169; and in the further references cited therein.

In the ground station according to the invention, the interrogation signal is received (at least in some signal strength) by a plurality of directional antennas 1, whose radiation patterns point in different directions. For the present embodiment, it is assumed that eight (I–VIII) directional antennas 1 are arranged equidistantly on a circle. The diameter of the circle is immaterial. Its minimum value is determined by the physical dimensions of the directional antennas. Nonadjacent alternate directional antennas are combined in two groups of four, i.e., I, III, V, VII in a first group and II, IV, VI, VIII in a second group. Other combinations and grouping may be chosen, but the evaluation described in the following must then be correspondingly adapted. This adaptation can be carried out by any person of ordinary skill in the art once the principles of the invention are fully appreciated.

The output signals of the directional antennas of each group are applied to a radio frequency bridge circuit, e.g., a hybrid 2, 2', in which the individual signals are summed. During transmission, each of the hybrids distributes the reply signal to the individual directional antennas of the corresponding group as clearly indicated in FIG. 1. The output signal of the hybrid 2 is applied to the transmit/receive circuit 3 of block A, and the output signal of the hybrid 2' is applied to the transmit/receive circuit 3' of a block B. The output signals of the transmit/receive circuits 3, 3' are applied to receivers 4, 4' respectively, and the output signals of the receivers 4, 4' are applied to delay lines 5, 5'. The transmit/receive circuits 3, 3', the receivers 4, 4', and the delay lines 5, 5' are of the same design. Block A also contains the priority and filler-pulse device 6 and the transmitter 7. In addition to feeding signals to the delay lines 5, 5' the receivers 4 and 4' deliver the received DME signal, which has been converted to the intermediate frequency, to an amplitude comparator 8 (the receiver may be, for example, of the type described in "Elektrisches Nachrichtenwesen", Vol. 50, No. 4, 1975, on page 276; the i-f signal being taken from the output of the i-f amplifier at 63 MHz). The amplitude comparator 8 determines which output signal, i.e., of the first antenna group (I, III, V, VII) or of the second antenna group (II, IV, VI, VIII), has the greater amplitude, and controls a switching device 9 so that the priority and filler-pulse device 6 is fed with the output signal of that delay line 5, 5' which is associated with the antenna group delivering the signal with the greatest amplitude. The priority and filler-pulse device 6 controls the transmitter 7 as described above in connection with a prior art DME ground station, and the transmitter transmits the reply signal. The reply signal is applied to a switching device 10, which is so controlled by the amplitude comparator 8 that the reply signal is applied to that transmit/receive circuit (3 or 3') which is associated with the antenna group delivering the signal with the greatest amplitude. The reply signal is applied through the transmit/receive circuit 3, 3' to the hybrid 2, 2', which feeds it to the four antennas of the selected group, from where it is radiated.

The circular array may alternatively be replaced by other arrays, such as semicircular or linear ones.

Figure 2:
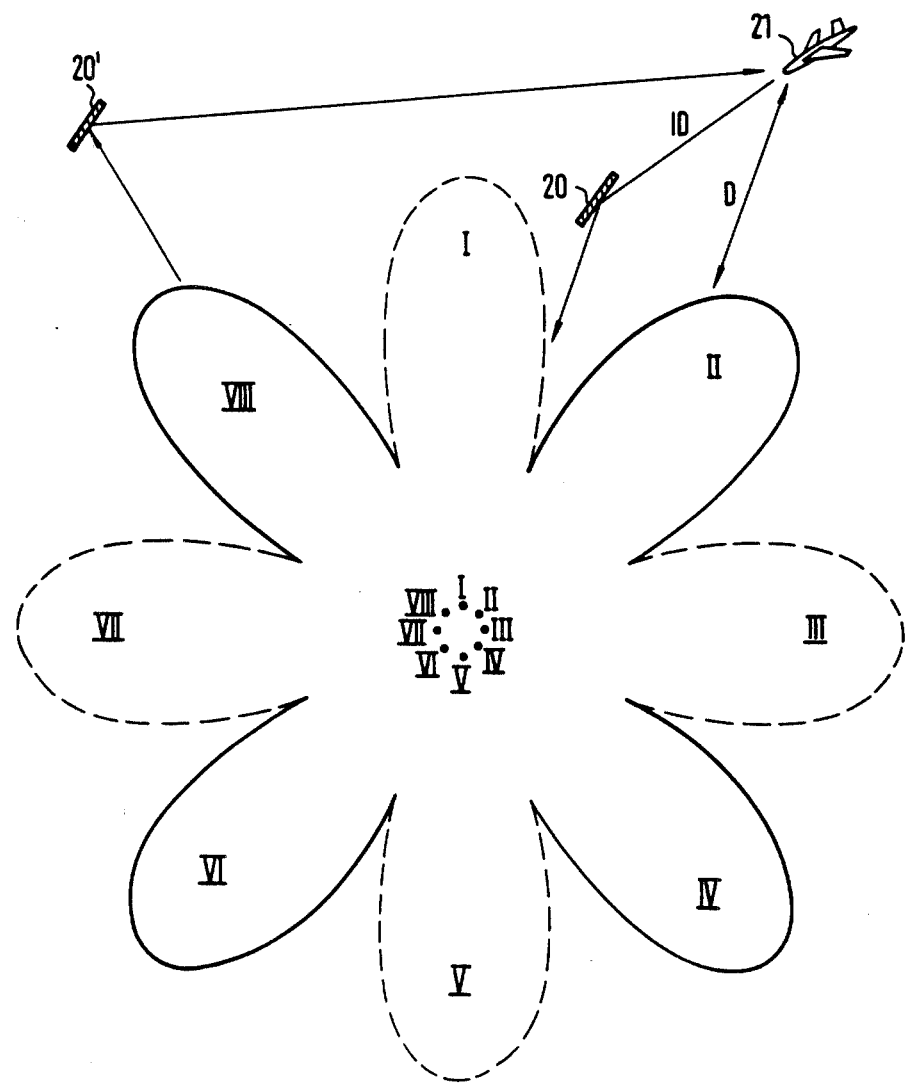
FIG. 2 shows the resulting radiation pattern of the directional antennas of the DME ground station of FIG. 1.

The pointing of the directional patterns of the eight directional antennas I to VIII will now be explained with the aid of FIG. 2. As mentioned above, in the embodiment being described, the directional antennas are arranged equidistantly on a circle. The radiation patterns, which are symmetrical and of the same shape for all antennas, each extend radially and have a half-power width of, e.g., 45°. With eight directional antennas, an azimuth coverage of 360° is thus obtained. Such a directional antenna array is known from German Pat. No. 977,793, where it is used for a direction finder.

An aircraft 21 equipped with a DME interrogator-responder is assumed to radiate an interrogation signal to the ground station. The interrogation signal travels to the ground station by the direct path D and, possibly, by an indirect path ID because it is reflected from an obstacle 20. The direct signal is received via the radiation pattern II, and the indirect one via the radiation pattern I. The antenna gain for the direct signal is greater than that for the indirect one.

Furthermore, the reflection coefficient of an obstacle is normally ≠1, so the amplitude of the signal will be attenuated during the reflection. From this and from similar considerations for the other radiation patterns it follows that the hybrid of the group including the directional antenna II delivers the signal with the greater amplitude.

The reply signal is radiated, as described above, by the directional antennas of this group, i.e., in the present case, by the antennas II, IV, VI and VIII. However, only the signal radiated from the directional antenna II is received by the interrogator as the reply signal. The signals radiated by the other directional antennas do not reach the interrogator as a result of their particular directivity. Via the adjacent directional pattern I, no signal is being radiated at that instant.

If a reply signal radiated from another directional antenna, e.g. from the antenna VIII, reaches the interrogator because it is reflected from a further obstacle 20', this reflected signal will not be disturbing, for the pulses of the direct and indirect signals are so far apart in time that they can be separated in the interrogator-responder.

Of the four radiated reply signals, one is thus the "genuine reply signal", while the three others serve as filler pulses. To radiate the specified number of filler pulses in all directions, after radiation of the reply signal, changeover is preferably effected from one group to the other, from where filler pulses are then radiated if no interrogation signal has to be replied to at that moment.

The radial directional patterns of adjacent directional antennas are preferably chosen to be contiguous; but obviously they may also overlap one another, however. It is also possible that adjacent directional patterns of a group—e.g. II and IV—be contiguous or overlap only slightly, and that the directional pattern of the intermediate directional antenna of the other group is superimposed on these two patterns. The resulting radiation pattern may be called an "omnidirectional pattern of sorts with severe reductions of field strength".

As far as the avoidance of multipath errors is concerned, optimum conditions are achieved if the reply signal is radiated via a directional pattern chosen so that during the time interval between the reception of the direct reply signal and the indirect reply signal (if less than 3 μs so that, signals cannot be separated in the interrogator), no reply signals reflected from obstacles reach the interrogator. As many pulses as possible are presumed to be contemporaneously radiated as filler pulses in the other directions.

What is claimed is:

1. A DME ground station comprising:
   first and second directional antenna groups each including a plurality of directional antennas, each of said directional antennas being oriented to produce a different angle of maximum radiation;
   first means operatively connecting said antennas in first and second groups, said antennas being connected such that the radiation patterns of said antennas of said second group alternate in spatial relationship with respect to said antennas of said first group, said first means providing first and second ports connecting to said antennas of said first and second groups, respectively;
   second means including first and second receivers connected to said first and second ports, respectively, for receiving DME interrogation pulses;
   transmitting means responsive to said received interrogation pulses for generating a reply pulse group;
   third means responsive to the outputs of said first and second receivers for comparing received signal outputs of said first and second receivers; and
   for connecting said transmitting means to the one first antenna groups corresponding to said receiver having the larger of said received signal outputs, thereby to transmit said reply pulse group in the direction from which the larger interrogation signal amplitude was received.

2. Apparatus according to claim 1 in which duplexing means are included between said first and second ports, said first and second receivers and said third means.

3. Apparatus according to claim 2 in which said transmitting means includes means for transmitting a series of non-synchronous filler pulses at times when no interrogation pulse is received and in which said third means is adapted to alternate said filler pulses between said antenna groups.

4. Apparatus according to claim 1 in which said transmitting means includes means for transmitting a series of non-synchronous filler pulses at times when no interrogation pulse is received and in which said third means is adapted to alternate said filler pulses between said antenna groups.

5. Apparatus according to claim 1 in which said antennas are arranged symmetrically about a radiation center.

6. Apparatus according to claim 5 in which said antennas are symmetrically arranged on a circle.

7. Apparatus according to claim 6 in which said antennas are oriented to direct their radiation patterns radially outward from said circle.

8. Apparatus according to claim 7 in which said antenna patterns each are substantially 360/n degrees in width at half-power points, where n is the number of said antennas placed about said circle.

* * * * *